United States Patent [19]

Maclaren

[11] 4,116,465
[45] * Sep. 26, 1978

[54] BABY CARRIAGES

[75] Inventor: Owen F. Maclaren, Barby, near Rugby, England

[73] Assignee: Gannet Holdings Limited, Channel Islands

[*] Notice: The portion of the term of this patent subsequent to Nov. 29, 1991, has been disclaimed.

[21] Appl. No.: 737,011

[22] Filed: Oct. 29, 1976

[30] Foreign Application Priority Data

Nov. 3, 1975 [GB] United Kingdom ............ 973092/75
Nov. 18, 1975 [GB] United Kingdom ............ 47452/75

[51] Int. Cl.² ............................................. B62b 11/00
[52] U.S. Cl. ................................. 280/647; 280/649
[58] Field of Search ............... 280/642, 644, 647, 649, 280/650

[56] References Cited

U.S. PATENT DOCUMENTS

| 3,070,385 | 12/1962 | Claessens | 280/642 |
| 3,390,893 | 7/1968 | Maclaren | 280/644 |
| 3,836,164 | 9/1974 | Sugino | 280/642 |
| 3,917,302 | 11/1975 | Gebhard | 280/644 |
| 3,995,882 | 12/1976 | Watkins | 280/650 |

FOREIGN PATENT DOCUMENTS 1,321,085 6/1973 United Kingdom.
1,370,701 10/1974 United Kingdom.

Primary Examiner—Robert R. Song
Attorney, Agent, or Firm—Stevens, Davis, Miller & Mosher

[57] ABSTRACT

Foldable carriages, strollers, wheeled-chairs, carts and the like assemblies which simultaneously fold in two of their three dimensions to form a folded stick-like or umbrella like bundle, i.e., of the Maclaren type, are provided with complementary collapsing structure for supporting a pram-type cot, which is interchangeable with a stroller-type seat. The specific supporting structure, cot structure and interchangeable seat are disclosed.

20 Claims, 8 Drawing Figures

BABY CARRIAGES

This invention relates to foldable baby carriages or comparable folding carriage-chairs, often referred to as "invalid chairs". In particular the invention relates in general to foldable carriages which collapse or fold in two dimensions, namely the front-back (first) dimensions in which folding is usually in the vertical plane, in which plane lies the track in which the carriage is normally intended to move on wheels and the (second) dimension transverse to the first. It is a consequence of such folding that the structure of the carriage when extended is a three-dimensional frame, but when folded its elements lie nearly like a bundle, or by analogy like the handle and ribs of an umbrella, often referred to as folding in stick or umbrella form. When folded, the structure is in dimension of considerable length but of relatively small cross-section. Such carriages are typified in Maclaren U.S. Pat. No. 3,390,893 and British Pat. No. 1,154,362 which has come to be generally recognized by the British Trade Mark "Baby Bugg," and in modified form in Maclaren U.S. Pat. No. 3,736,021 and British Pat. No. 1,321,085 and in a form which is geometrically different but has the same general character, in that it is "stick" folding, in U.S. Patent Application Ser. No. 409,590. Carriages of the general kind will for convenience hereinafter be referred to as being "of the kind stated" whenever the context is appropriate.

It is an aim of the present invention to provide a carriage of the kind stated in which the actual accommodation for the child is separable and may be used as a portable cot or crib and as such may itself be folded when unoccupied.

It is, moreover, characteristic of the invention that the relationship between the frame and the cot when positioned thereon is such that an element or elements of the frame which collapse or fold in the transverse dimension are held in their extended state by the cot and the cot is supported by them.

While generally we are considering a detachable cot it is to be understood that the so-called cot may be any container of similar nature, for example a container for household goods or personal belongings: such things are intended herein to be included, it being fairly usual practice for perambulators, baby carriages, and the like to be used for a wide variety of transport purposes. The terms "cot" or "crib" are therefore not to be considered as limited only to containers for babies.

It is also possible, by the invention, to provide that the removable and separately useful cot constitutes adequate seat and back arrangements for a child or children sitting rather than lying in the cot. The invention aims to provide that the same carriage frame which is adapted to be complementary to a detachable cot, can have readily fitted to it the usual pliable seat and back thus being convertible into a normal "Baby Buggy".

Adaptation of the normal carriage frame of the kind stated to the present invention wherein the cot is mounted thereon, is made more rigid and any risk of inadvertent collapse is virtually eliminated. This is because the positioning of the cot on the frame tends to lock the frame in its unfolded, extended position.

The invention includes the cot as a unit, the folding frame or structure adapted to accept the cot and safely support it, a unit constituting a detachable seat and back, usable as an alternative to the cot, and the carriage as a whole, i.e., the combination of cot and frame structure, which will usually constitute the device as actually sold. The cot and the structure may therefore be regarded as mutually complementary components, and the seat and back unit as a complementary component for use alternatively to the cot.

The well-known "Baby Buggy" is a stroller or wheeled chair, having a seat and back constituted by fabric so attached to the structure as to fulfill the purpose while being completely foldable. When the present invention is used the fabric may be omitted, its function of accommodating the child being fulfilled by the cot; and the cot having been removed, a fabric seat and back unit may be installed as an alternative. It is to be noted that the structure adapted to carry the cot is such that without mechanical modification it is usable with the seat and back unit whereupon the carriage is in part functionally the same as the known "Baby Buggy".

According to the invention, a carriage of the kind referred to is adapted to support a removable cot by the provision of at least one element which is attached to the frame to extend transversely between attachments of such element to the frame when the frame is in extended condition, such element being collapsible in the transverse sense when the frame is collapsed, such element being adapted when extended to support the cot. Preferably there are two such elements, the first being located to support one end of the cot and the second to support the other end. The invention includes a carriage as immediately above stated further characterized in that said element when supporting the cot is thereby constrained in a manner to oppose its transverse collapse.

Further according to the invention, an element as above mentioned takes the form of an X-frame added to the existing carriage frame, and consisting of two rigid members, which are interpivoted between their ends, and one end of each member is articularly attached to the carriage frame in the region of its front wheels in such manner as to allow it to collapse or extend in the transverse dimension of the carriage frame and also to allow its plane to swing forwardly about the articular attachments when the frame is in its unfolded, extended position, the other ends of its members then being engageable with the cot in the region of the front end thereof. Hence, this X-frame supports the front end of the cot against vertical load, and lateral loads, and against transverse rocking.

The invention further provides another form of transverse and collapsible element, namely a toggle bar, of a nature and arrangement which is previously known, which, in a preferred structure, is pivotally connected to the carriage from near the upper ends of its rear X-frame, and which is arranged to collapse by upward movement of its knuckle, and which is adapted when extended to be engaged by the cot in the back region thereof, in such a way that vertical load due to the cot holds this toggle bar locked in its extended condition. The toggle bar therefore supports the cot vertically, and also contributes to stiffness of the carriage frame against lateral deformation. A toggle bar so located, but not fulfilling the present purpose, is indicated in broken line in the drawings of the aforementioned U.S. and British Patents.

There may, however, be less elaborate embodiments of the invention. For example, the cot-supporting elements or one of them, may simply consist of pliable strapping attached by its ends to side members of the carriage frame to stretch across the frame when extended, thereby also contributing by its tension to the lateral stiffness of the frame and supporting the cot which then rests directly on such element. Such an element may be used at one end of the cot while an element of rigid members, i.e., the X-frame above mentioned, may be used at the other end.

Means are also provided to secure the cot onto the frame.

A cot adapted to be used as a detachable unit complementary to a carriage frame of the kind stated, is itself preferably collapsible, at least vertically, to form a substantially flat pack. This is not in itself new in carry-cots, but the invention provides such feature in a particular way which makes it especially suitable for the purposes of the present invention. Moreover, the present cot may be constructed so that it is readily adapted to provide sitting accommodation either for one, or two, children, as will be seen.

It is a further feature of the invention, which as a practical matter is an outcome of the above-stated way of providing for cot support, that there may also be provided a detachable seat and back unit consisting mainly of pliable material such as woven plastic yarn which can be attached or detached with great ease as an adjunct to the carriage frame in place of the cot, the assembly then being for all practical purposes a normal "Baby Buggy".

BRIEF DESCRIPTION OF THE DRAWINGS

The invention will now be described, by way of example, with the aid of the accompanying drawings in which.

Figure 1:
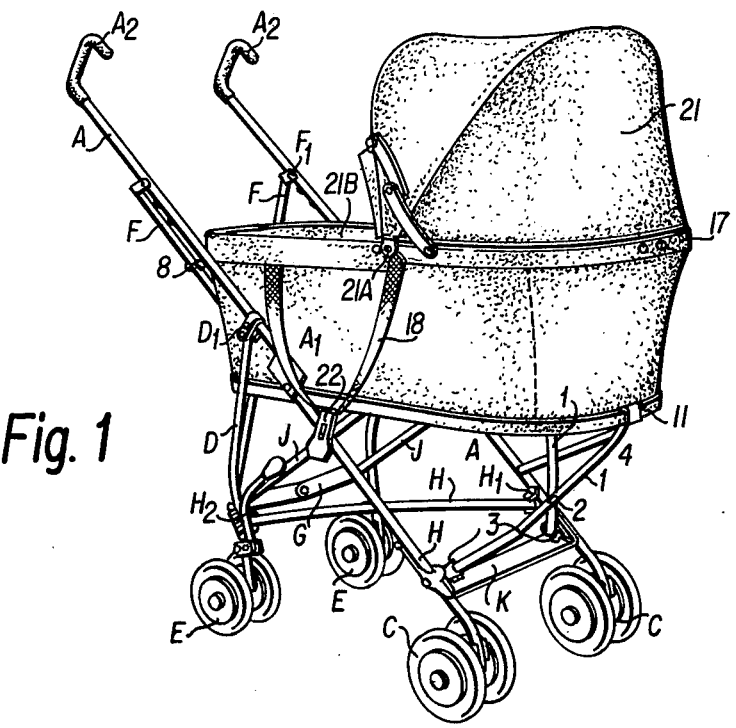
FIG. 1 is a perspective view illustrating the carriage with cot installed.

In the following description, reference capital letters are used to denote parts which are common to ordinary "Baby Buggies" as in U.K. Pat. No. 1,154,362. Numerals are used to denote additional material.

A carriage frame according to one example of the invention consists basically of two side frames, and two X-frames which when extended extend in transverse planes. The side frames are formed by so-called hypotenuse elements A which are knuckle-jointed at A1, the front bottom ends of elements A carry single or twinned front wheels C. The upper ends of elements A form handles at A2. The joints at A1 are such as to allow folding through 180° or so. The upper members of elements A are pivotally jointed at D1 to rear legs D, the bottom ends of which carry twinned rear wheels E.

A rear X-frame consists of two interpivoted rigid elements F the upper ends of which are pivotally attached, for example at F1, to the elements A, by joints which, in effect, allow universal articulation between A and F such as to allow collapsing in the transverse sense, of the X-frame about its interconnection and also the swinging forward during folding of this X-frame F. The lower ends of the X-frame F are likewise attached near the lower wheels E, to the legs D. In the immediate vicinity of the joints at F2, the legs D are interconnected by a lower knuckle-jointed toggle-bar G which "breaks" by upward movement for folding, this being conveniently effected by the user's foot. The toggle-bar G plays a major part when the carriage is extended, by acting as a compression strut between the wheels E and the sides of the frame as a whole.

The basic frame is completed by the bottom X-frame H which, like F, consists of pivotally interconnected rigid members. In this case, frame H has its ends articularly jointed at H1 to the lower ends of the elements A, and to the legs D in the immediate vicinity of the joints at F2 by joints H2. It may be observed that the joints collected at F2, H2, may conveniently be comprised in one basic fitting such as a plastic molding.

The carriage frame above described is, basically, that of a "Baby Buggy" when completed by one further pair of side members, namely seat supports J. These extend from the vicinity of the joints at F2, H2 where they are pivoted upwards and forward to pivot joints at J1 with the lower members of the hypotenuse elements A. The supports J extend forward beyond the joints J1, to form projecting ends J2 which as will be seen, have an important function in the preferred embodiment.

It is convenient to consider as sides of the frame above described the elements or members A, D, and J, while the transverse elements are the X-frames F, H, and toggle bar G.

Adaptation of the frame, in the described preferred embodiment, resides mainly in two additional elements. There is provided a third X-frame consisting of members 1 which are pivotally interconnected between their ends, at 2. The bottom ends of the members 1 are articularly connected at 3 with at least 2-axis freedom to the elements A just above the wheels C and, for convenience, using the same fittings as those which attach the footrest strap K to the elements A. The joints at 3 permit both folding of the third X-frame members 1, and the back-to-front swinging of the plane in which they substantially lie, we say "substantially" because the members 1 or either of them, is slightly bowed to afford their interaction, as can be discerned e.g. in FIG. 1. The third X-frame may have at least one pliable strap 4 attaching it to one or both of the members of the bottom X-frame H. The purpose of strap 4 is to allow the plane of the third X-frame to swing back (see arrow 5, FIG. 3) when out of use but to limit its forward swing when in use the condition shown in FIGS. 1 and 3. It will be evident that the third X-frame when forward, supports the front end of the cot.

The rear X-frame members F have a transverse interconnecting element in the form of an upper toggle bar 6 having a central knuckle-joint at 7, and pivot attachments at 8 to the upper parts of the members F. A tension spring 8A (FIG. 5) tends to keep the toggle bar 6 in its extended condition. The toggle bar 6 acts in compression when extended bracing the X frame elements F and hence the handles A2 apart, and it contributes transverse stiffness to the frame structure supplemental to toggle bar G. Also, however, in the example the upper toggle bar 6 forms a transverse element to support the weight of the rear end of the cot; and such weight tends to keep the toggle bar 6 in its extended condition so that the cot is properly supported. There is no chance of the frame folding even if the person using it were inadvertently to "break" the lower toggle bar G. The upper bar 6, like G, "breaks" upwardly to collapse.

Figure 2:
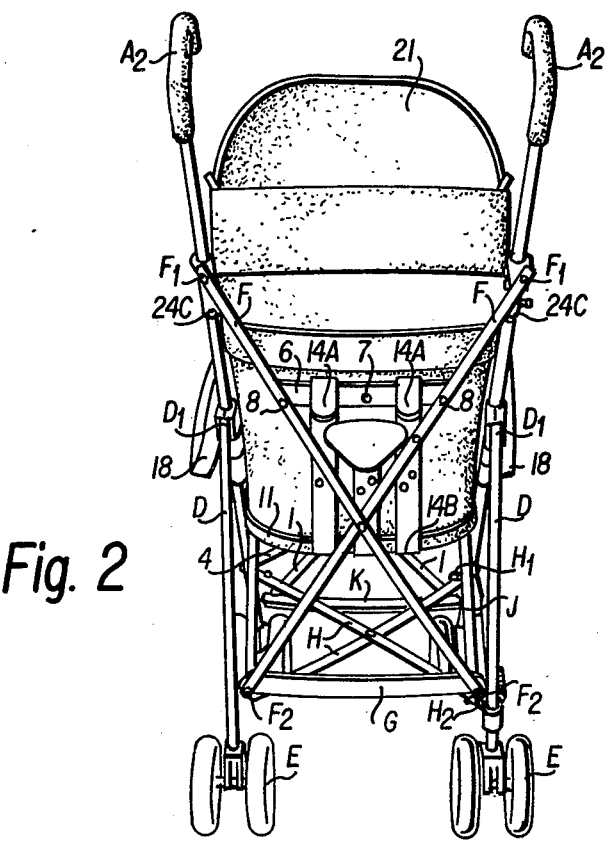
FIG. 2 is a rear view of the same.
Figure 3:
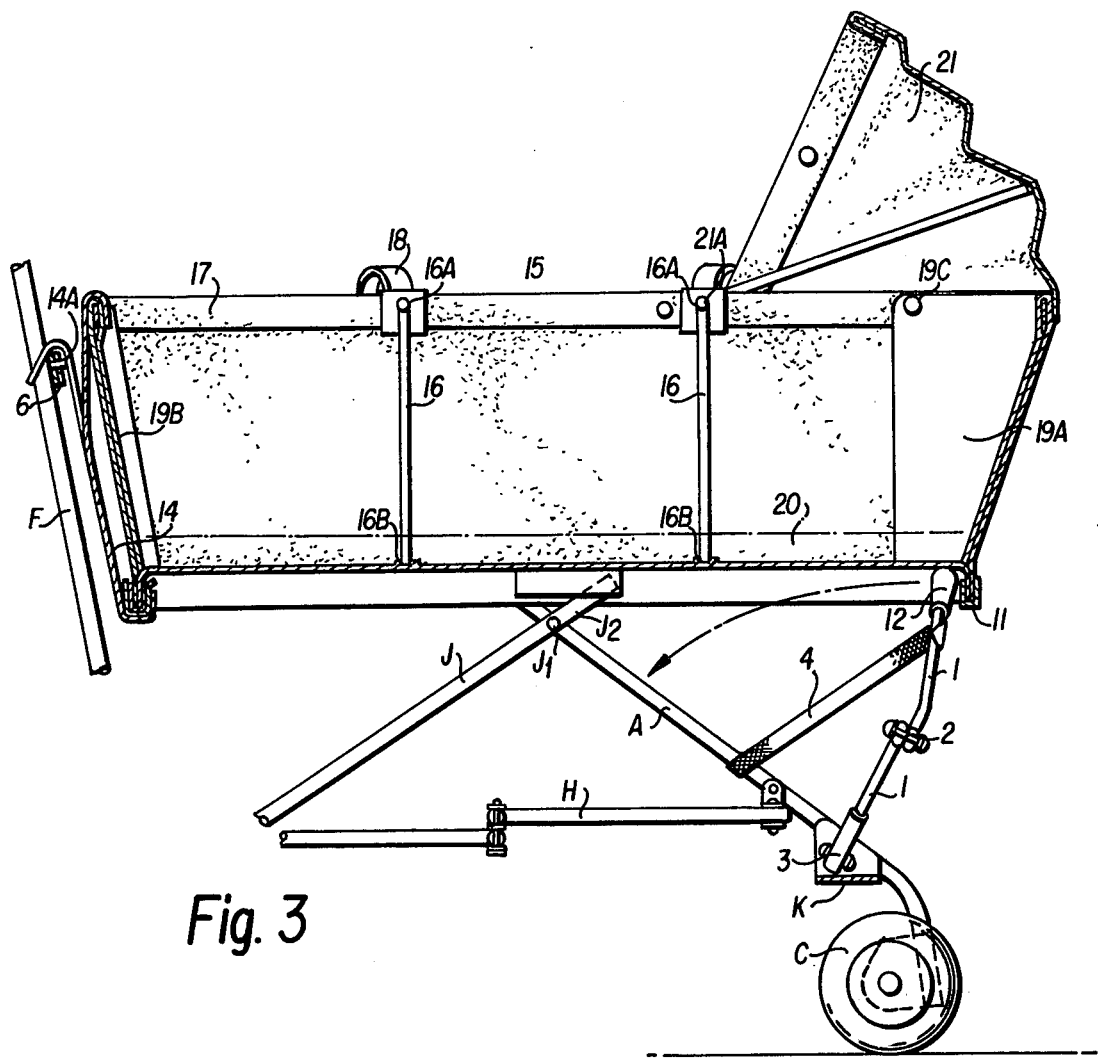
FIG. 3 is a schematic side elevation of parts of the carriage of FIGS. 1 and 2, illustrating in greater detail various structural features.
Figure 4:
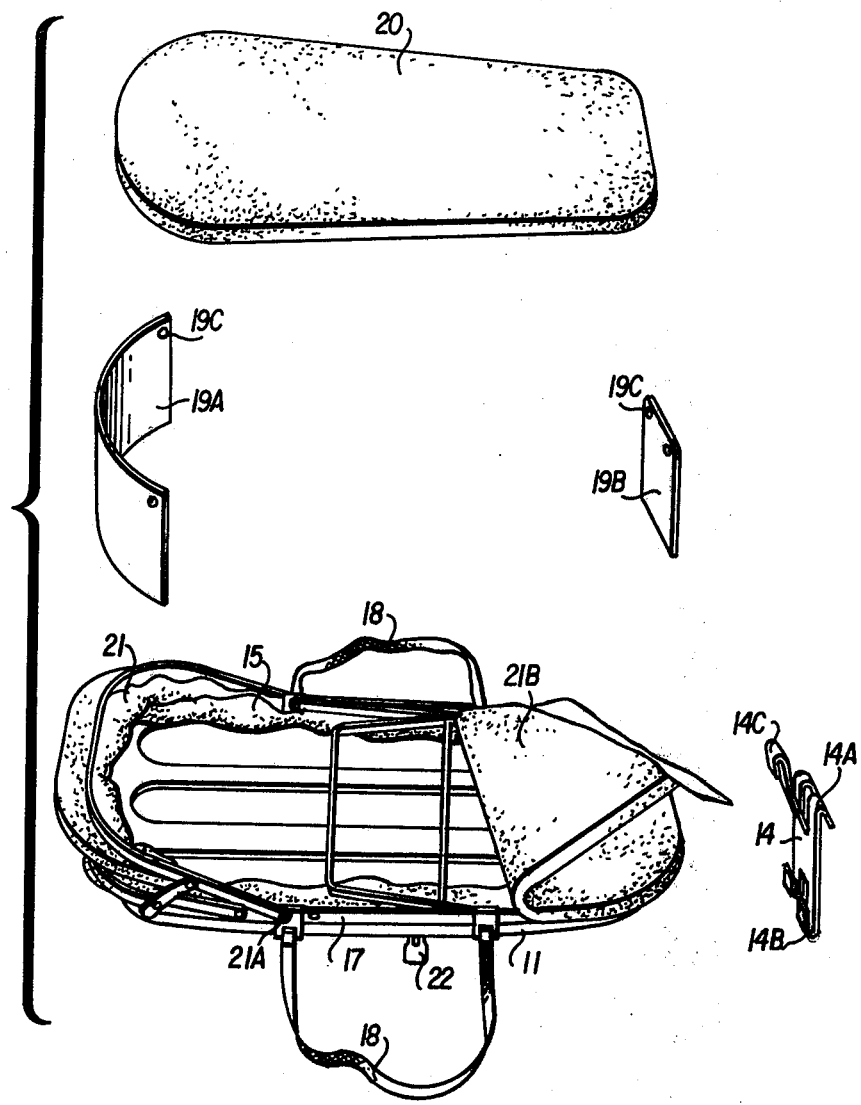
FIG. 4 shows perspective and in approximately related positions, a collapsed cot and its associated components.

Considering now the cot itself, it is shown in a general way mounted on the frame in FIGS. 1 and 2, and its structure is clear from FIGS. 3 and 4. The cot so illustrated as a rigid floor 10 from the periphery of which extends downwardly a flange or margin 11 constituting a space frame, conveniently a metal strip. At the front of the cot, the upper ends of the third X-frame memers 1 engage when extended against the floor 10 and flange 11 to support the weight of the cot and also restrain these upper ends from spreading apart transversely. This engagement and the ends are represented at 12, FIG. 3 and 5, and the engaged ends preferably have protective rubber ferrules at this location. When the cot is removed the plane of the third X-frame is swung back into the position shown in FIG. 5. When extending the frame to locate the cot, the strap or straps 4 approximately locate the plane of this x-frame, this facilitating dropping the cot into engagement with the third X-frame.

At the rear end of the cot is provided a detachable S-shaped hook, seen separately at 14 in FIG. 4 and in use in FIG. 3. The upper end 14A of 14, which is forked is to engage the two members 6 of the second toggle bar, which are adapted for this engagement, and its lower end 14B (also forked) engages the flange 11. This hook may have a third portion 14C, to engage the upper margin of the cot when the latter is extended as will be described below. The purpose of the hook 14 is to suspend the rear end of the cot on the toggle bar 6 which also tends to keep the bar extended. When the cot is collapsed the hook is detached and can simply be housed in the collapsed cot.

As to the cot itself, the floor 11 has an upwardly extending wall 15 of pliable material, e.g. a sheet plastic material. This is attached around the flange 11 and forms side and end walls. Two hinged and U-shaped stretchers 16 are pivoted to an upper cot-frame hoop member 17 which hoop is similar in plan to, but somewhat larger then, the flange 11. To this hoop 17 and the wall 15, carrying loops 18 are attached. The stretchers 16, pivoted at 16A, when extended lodge in transverse grooves 16B, or against stops, provided by the floor 10, it requires but little force to dislodge them for collapsing the cot. Front and back stiffeners 19A, 19B, are provided with snap-fastening studs 19C engaging complementary fittings within the wall 15. These serve to stiffen and protect the end portions of the wall 15 and also to retain its intended shape when extended. They are removed when the cot is folded as seen in FIG. 4, and can simply be stowed on the floor 10. It can be seen that when the cot is folded as in FIG. 4, the hook 14 disengagement occurs as the hook part 14C is lifted from the upper margin of the cot. A mattress 20 is provided to fit within the cot on its floor 10. A folding hood 21 is attached at 21A to the hoop 17, and a weather apron, as shown illustratively at 22 (FIG. 4), can usefully be provided with snap fastening to the hoop 17. By shifting the stretchers 16 to the horizontal position (see FIG. 4) and dislodging the stiffeners 19A and 19B, the cot is collapsible to the condition shown in FIG. 4.

The cot is located on the frame by placing it on the ends 12 of struts 1, and engaging the hook 14 on togglebar 6. It is then secured by buttoning two elastic tabs 22 on to heads of the pivots at J1, the pins of which pivots are extended for this purpose. The cot is thus held securely against dislodgement.

Figures 5, 6:
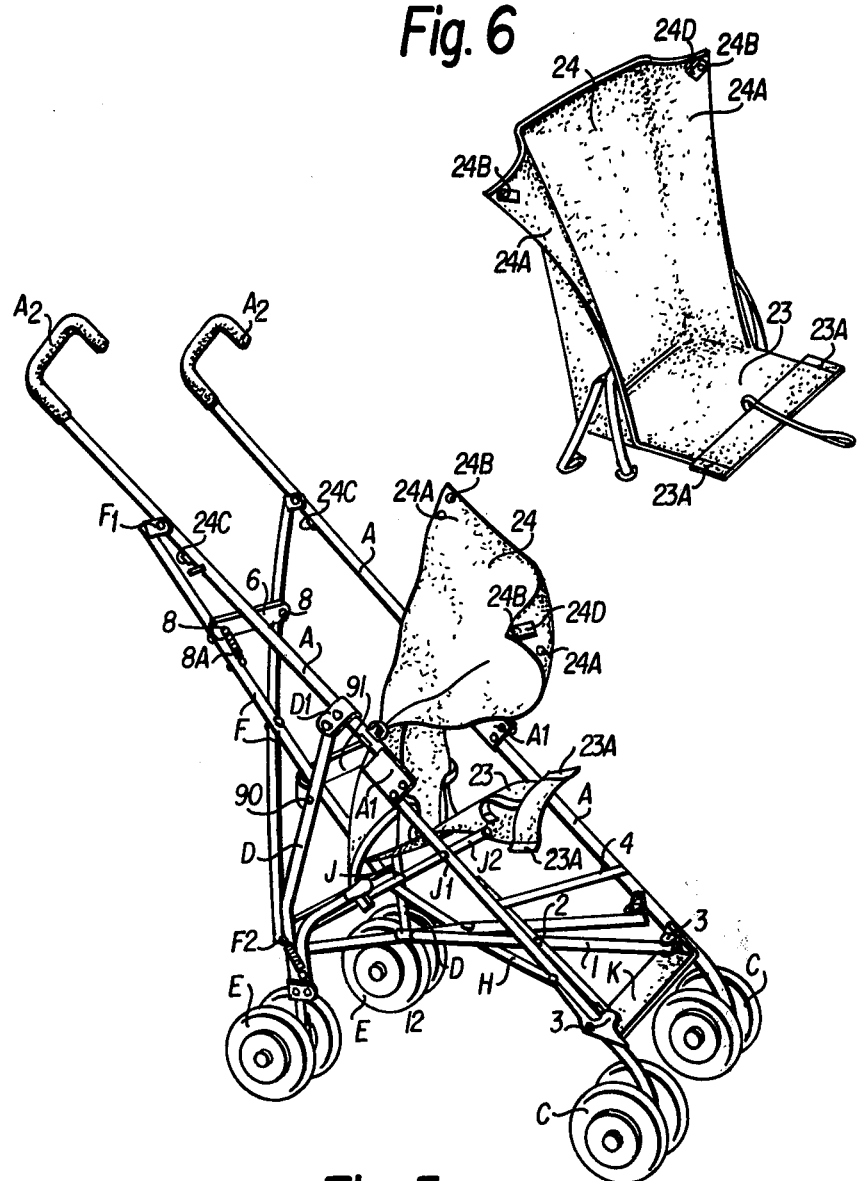
FIG. 5 illustrates in the perspective of FIG. 1, the carriage frame in extended configuration and schematically, a seat and back unit imagined to be in the course of attachment.
FIG. 6 illustrates in perspective and more clearly, the same and back unit of FIG. 5.

Referring now to FIGS. 5 and 6, it is perhaps useful to refer to FIG. 5 both for the immediate purpose, and because it shows the carriage frame very clearly. The immediate purpose is, however, to illustrate how, when the cot is removed, a seat and back unit may easily replace it. FIG. 6 illustrates this unit. It consists basically of a woven fabric seat part 23 of which the front corners 23A are fashioned to engage with and be secured by the ends J2 previously described. The back part 24, which may be attached to or be integral with 23, together with the seat part complete an almost conventional "Baby Buggy" seat and back. As in the known construction, the upper corners 24A of the back part 24 are somewhat extended so that they can wrap round, rather more than through 180°, the upper parts of elements A below the handles A2. Each corner 24A has a fastener at 24B of the particular kind which while resembling an ordinary press-stud, in fact relies on angular lifting for its disengagement. Each is complemented by a rivet or like head at 24C on the members A. With each such fastener there is also associated a fabric tab 24D to enable the user to "prise" the fastener off for detachment to effect the required angular lifting. Such fasteners, known in the U.K. as "Carr" fasteners, are, of course, so oriented that no amount of tension in the back part 24 will cause their detachment.

Figure 7:
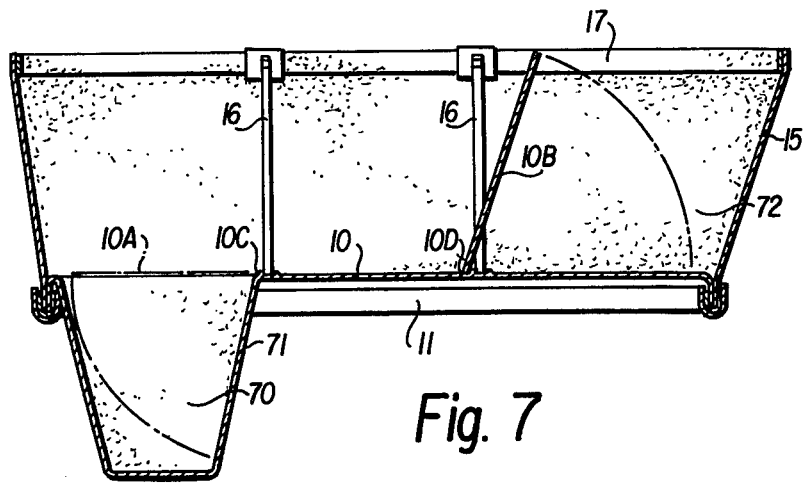
FIG. 7 illustrates in side elevation, the structure of a cot adapted to afford sitting accommodation for a child and if required stowage space for packages etc.

Referring now to FIG. 7, the cot shown is in essence, as above described. In this variant the floor 10 is provided with a well at 70, formed by a pliable sheet material wall 71. This is to accommodate the legs of a sitting child. That part of the floor which is shown in broken line at 10A is removable and is used, by being held by appropriate straps, pressbuttons, or other simple fastening means, as a seat back shown at 10B. Alternatively the floor part 10A may be hinged as at 10C to swing down into the wall at 70 and form a stiff rear wall thereof; and the back 10B may be hinged at 10D to be able to lie flat on the floor 10. In FIG. 7 the arcuate broken lines give an indication of the hinged functions. The mattress 10 of FIG. 4 can, of course, be so fashioned or made up of separate cushions, to be used in the FIG. 7 configuration as seat and back cushioning (not shown). The space at 72 behind the back 10B affords useful package stowage. The wall part 71 being of pliable material is collapsible, but it may have a rigid floor.

Figure 8:
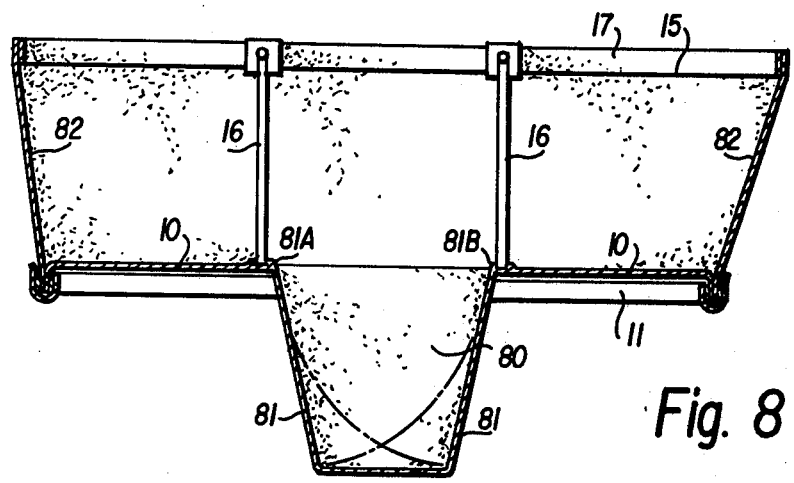
FIG. 8 illustrates a variant of FIG. 7, in which two children can be accommodated.

In FIG. 8, an adaptation is illustrated to accommodate two seated children. Here again a well is provided at 80 for the children's legs and it has walls 81 which may be hinged at 81A and 81B to the main floor 18 so that when the well 80 is not required, the walls 81 form part of the cot floor, simple fastening means again being provided. The ends of the cot wall form backs for the children's seats. Obviously again, the cot mattress can be fashioned to form cushioning in the sitting configuration.

Another feature of the present invention is the provision of relatively soft suspension for the wheel sets, which is provided by the use of rubber block-type shock absorbers mounted between the wheel sets and the struts and braces of the assembly, and by the use of larger, and softer wheels, as shown in the appended figures.

As mentioned earlier herein, the general type of carriage contemplated for use in the present invention is disclosed in U.S. Pat. No. 3,390,893, the entire disclosure of which is hereby incorporated by reference. In addition the carriage of the type disclosed in U.S. Pat. No. 3,736,021 may also be used, and the entire disclosure of that patent is also incorporated by reference herein.

What is claimed is:

1. A carriage, stroller, wheeled-chair, cart or like assembly which has a rigid three-dimensional structure when unfolded, and is capable of simultaneously folding in a plurality of its three dimensions to form a substantially stick-like bundle in its folded condition, said assembly comprising: a bottom cross frame of rigid members interpivoted at a point between their ends; a back cross frame of rigid members interpivoted at a point between their ends; pivot joint means interpivotally attaching one of the bottom frame members to one of the back frame members at each of two corners of said cross frames, said pivot joint means for permitting the members of each cross frame to pivot with respect to each other and for permitting said cross frames as a whole to pivot with respect to each other; two foldable brace members each comprising pivotally connected upper and lower members, one on each side of the assembly, pivotally attached to the bottom cross frame near the two other corners of the bottom cross frame, respectively, and to the back cross frame near the other two corners of the back cross frame, respectively; first releasable means for holding the members of at least one of the cross frames in an extended position when the assembly is unfolded; and second releasable means for holding said brace members in an extended position when the assembly is unfolded and for linking the folding actions of the foldable brace members and cross frames so that those folding actions occur simultaneously, said second releasable means comprising a pair of first strut members each pivotally connected to the upper member of one of said brace members and to a cross frame near the location of said pivot joint means, and a pair of second strut members each pivotally connected to the lower member of one of said brace members and to said pivot joint means; four wheel sets one near each corner of the bottom cross frame, two rear wheel sets being mounted on downwardly extended portions of said second strut members, and two front wheel sets being mounted on slightly extended ends of the foldable brace members; a third cross frame of rigid members interpivoted at a point between their ends with one end of one of the rigid members of said third cross frame being pivotally attached to one foldable brace member near one of said other corners of the bottom cross frame, and the other of said rigid members of said third cross frame being attached to the other foldable brace member near another of the other two corners of the bottom cross frame, said third cross frame simultaneously foldable with the remainder of the assembly, and pivotally extendable from a position substantially parallel the plane of the bottom cross frame to a position extending generally upwardly from said other two corners of the bottom cross frame in which position of said third cross frame comprises means for supporting the forward end of any carrying means mounted on the assembly.

2. The carriage assembly of claim 1, additionally comprising at least one element for extending transversely to the assembly when the assembly is unfolded, said element being collapsible in the transverse sense when the assembly is folded, and adapted when extended to support a removable carrying means.

3. The carriage assembly of claim 2, in which the one element consists of a knuckle-jointed toggle bar consisting of rigid members which are pivotally interconnected by a knuckle joint and which are connected by pivots spaced from such joint to members of the carriage assembly to cooperate with structure forming part of a removable carrying means for supporting said carrying means, and for being held in its transversely extended condition by vertical load imposed by a carrying means supported thereon.

4. The carriage assembly of claim 2 wherein said carrying means comprises a detachable cot having supporting attachment means at one end for engaging said one element, the other end of said cot being supported on the upwardly extending ends of the members of said third cross frame, the weight and position of said cot constraining said third cross frame and said one element in a manner opposing transverse collapse thereof, thereby further stabilizing the entire assembly.

5. The carriage assembly of claim 4 in which the supporting attachment means comprises a hook-like attachment means for simultaneously engaging said one element.

6. The carriage assembly of claim 5 in which the hook-like means is seperable from both the one element and the cot and is in the nature of an S-shaped cross-section, an upper hook of which is fashioned to engage said one element and a lower hook of which is adapted to engage an integral structural part of the cot to support the cot.

7. The carriage assembly of claim 2, in which a said one element is a transverse toggle-bar collapsible by upward movement, interconnecting the members of the rear cross-frame of the assembly near the upper ends thereof, and is such as to be engaged for vertical support of the cot when extended.

8. The carriage frame of claim 1, additionally comprising means for limiting the pivotal extendability of the third cross frame from its position substantially parallel the plane of the bottom cross frame toward its generally upwardly extending position, said limiting means defining said generally upwardly extending position.

9. The carriage assembly of claim 8, wherein said limiting means comprises a flexible cord-like member connected to the third cross frame and to another part of the assembly rearward of the other corners of the bottom cross frame.

10. The carriage assembly of claim 4 wherein said detachable cot structure is adapted to be mounted upon the carriage assembly, and comprises a rigid floor with flexible side walls attached to the periphery of said floor, which side walls are collapsible toward said floor, and movable strut means for holding said side walls extended upwards from the floor when the cot is in its extended position and for lying parallel to said floor when said cot is in its collapsed position.

11. The carriage assembly of claim 10 in which the cot includes separable and substantially rigid panels to support the wall when the cot is in its extended condition.

12. The carriage assembly of claim 4 wherein the cot has a rigid sheet-like floor the margin of which is a space frame comprising a downwardly extending flange and such flange provides support for vertical loads between the cot and the frame.

13. The carriage assembly of claim 4, additionally comprising means for attaching the cot to the said assembly when the cot is positioned for support by the assembly, and a detachable unit of preponderantly fabric-like pliable material with means for ready attachment of said unit to and detachment from said assembly, such unit forming a seat and back which, with said assembly, completes a seated carriage, the cot, said unit, and the carriage assembly, providing interchangeably a carriage with a cot, or a carriage for a sitting occupant.

14. The carriage assembly of claim 10 wherein the cot is adapted to be converted without structural change into a child seat.

15. The carriage assembly of claim 10 wherein the cot is adapted to be converted into a seat for two children.

16. The carriage assembly of claim 14 in which the adaptation resides in the provision of a downwardly extending well to afford leg-room for an occupant.

17. The carriage assembly of claim 16 in which part of the floor of the cot when in use as a seating accommodation is so constituted as to be usable as a seatback when the well is formed.

18. The carriage assembly of claim 1, wherein a fabric seat structure is attached to said second struts and to said brace members.

19. The carriage assembly of claim 1, wherein the upper end of each foldable brace member is formed in the shape of a handle.

20. A carriage, stroller, wheeled-chair, cart or like assembly which has a rigid three-dimensional structure when unfolded, and is capable of simultaneously folding in a pluralty of its three dimensions to form a substantially stick-like bundle in its folded condition, said assembly comprising: a bottom cross frame of rigid members interpivoted at a point between their ends; a back cross frame of rigid members interpivoted at a point between their ends; pivot joint means interpivotally attaching one of the bottom frame members to one of the back frame members at each of two corners of said cross frames, said pivot joint means for permitting the members of each cross frame to pivot with respect to each other and for permitting said cross frames as a whole to pivot with respect to each other; two foldable brace members each comprising pivotally connected upper and lower members, one on each side of the assembly, pivotally attached to the bottom cross frame near the two other corners of the bottom cross frame, respectively, and to the back cross frame near the other two corners of the back cross frame, respectively; first releasable means for holding the members of at least one of the cross frames in an extended position when the assembly is unfolded; and second releasable means for holding said brace members in an extended position when the assembly is unfolded and for linking the folding actions of the foldable brace members and cross frames so that those folding actions occur simultaneously, said second releasable means comprising at least one pair of strut members each pivotally connected to one of said brace members and to a cross frame near the location of said pivot joint means; four wheel sets one attached near each corner of the bottom cross frame; a third cross frame of rigid members interpivoted at a point between their ends with one end of one of the rigid members of said third cross frame being pivotally attached to the lower member of one foldable brace member near one of said other corners of the bottom cross frame, said third cross frame simultaneously foldable with the remainder of the assembly, and pivotally extendable from a position substantially parallel the plane of the bottom cross frame to a position extending generally upwardly from said other two corners of the bottom cross frame in which position of said third cross frame comprises means for supporting the forward end of any carrying means mounted on the assembly.

* * * * *